March 14, 1961  R. D. RUMSEY  2,974,905
LINEAR TYPE SHIMMY AND STEER DAMPER
Filed Dec. 10, 1956  6 Sheets-Sheet 1
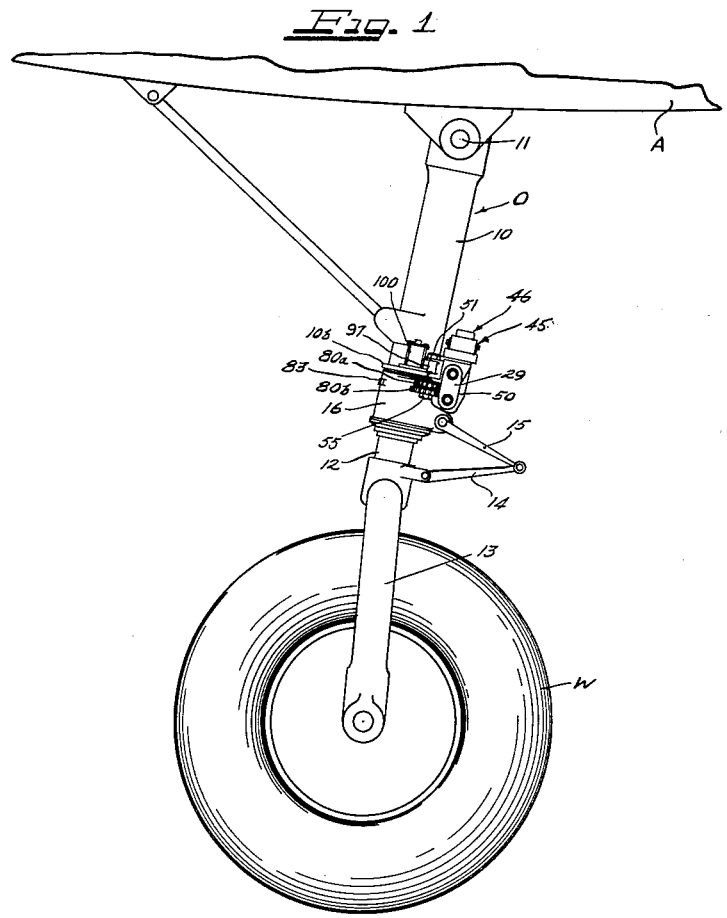
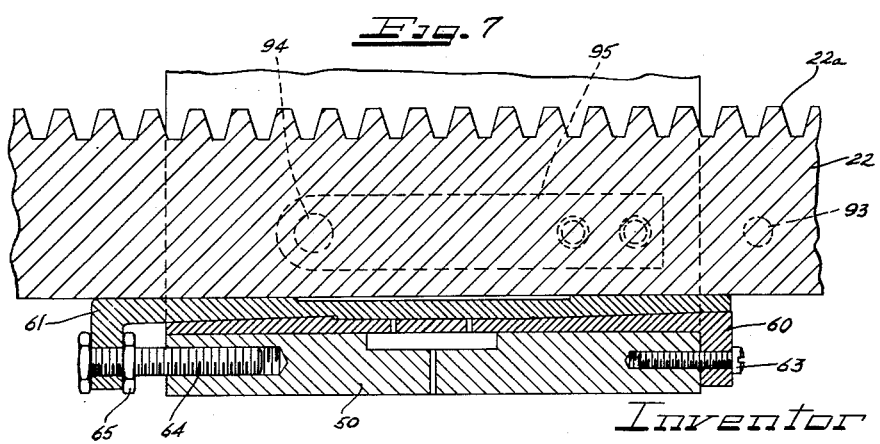
Inventor
ROLLIN D. RUMSEY
by  Attys.

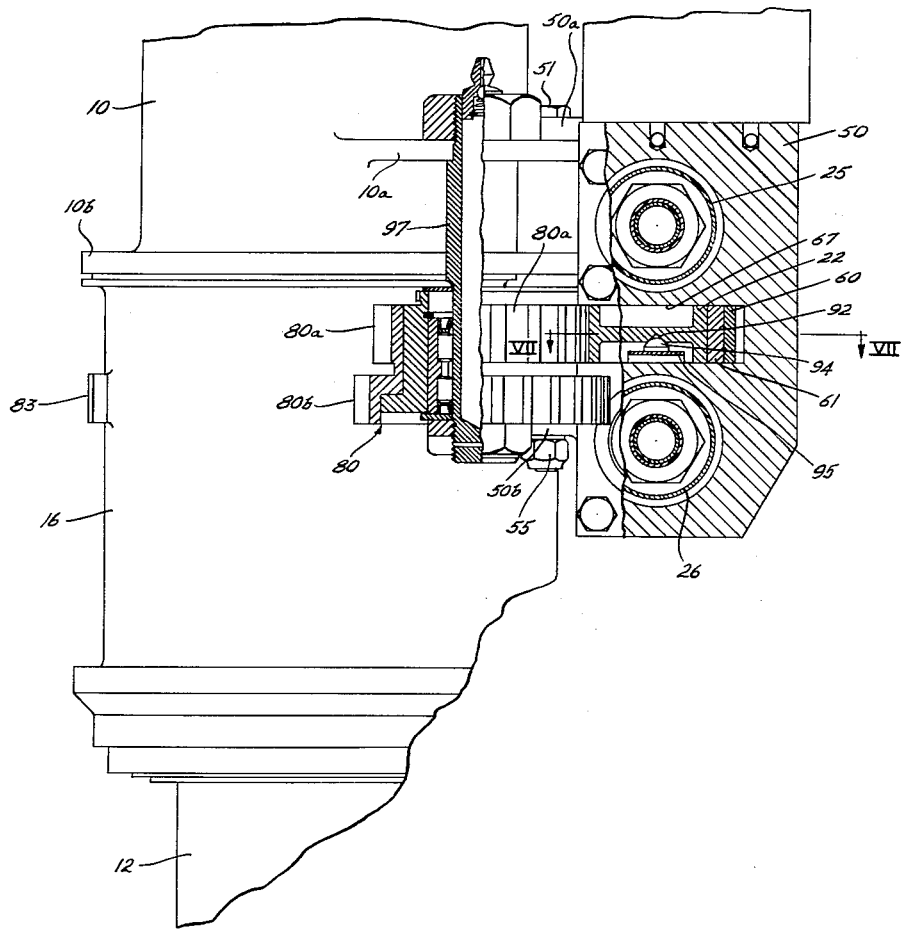

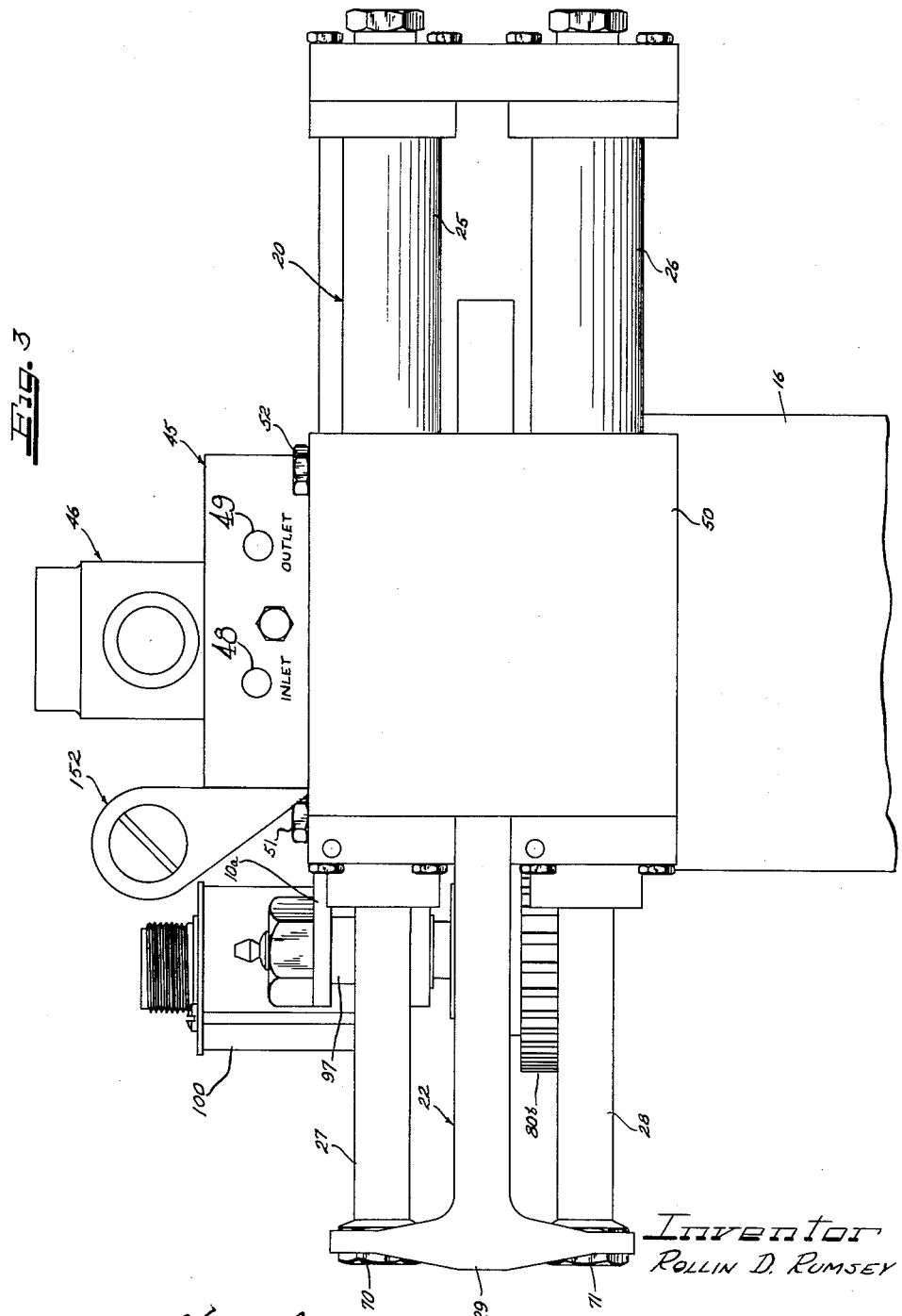

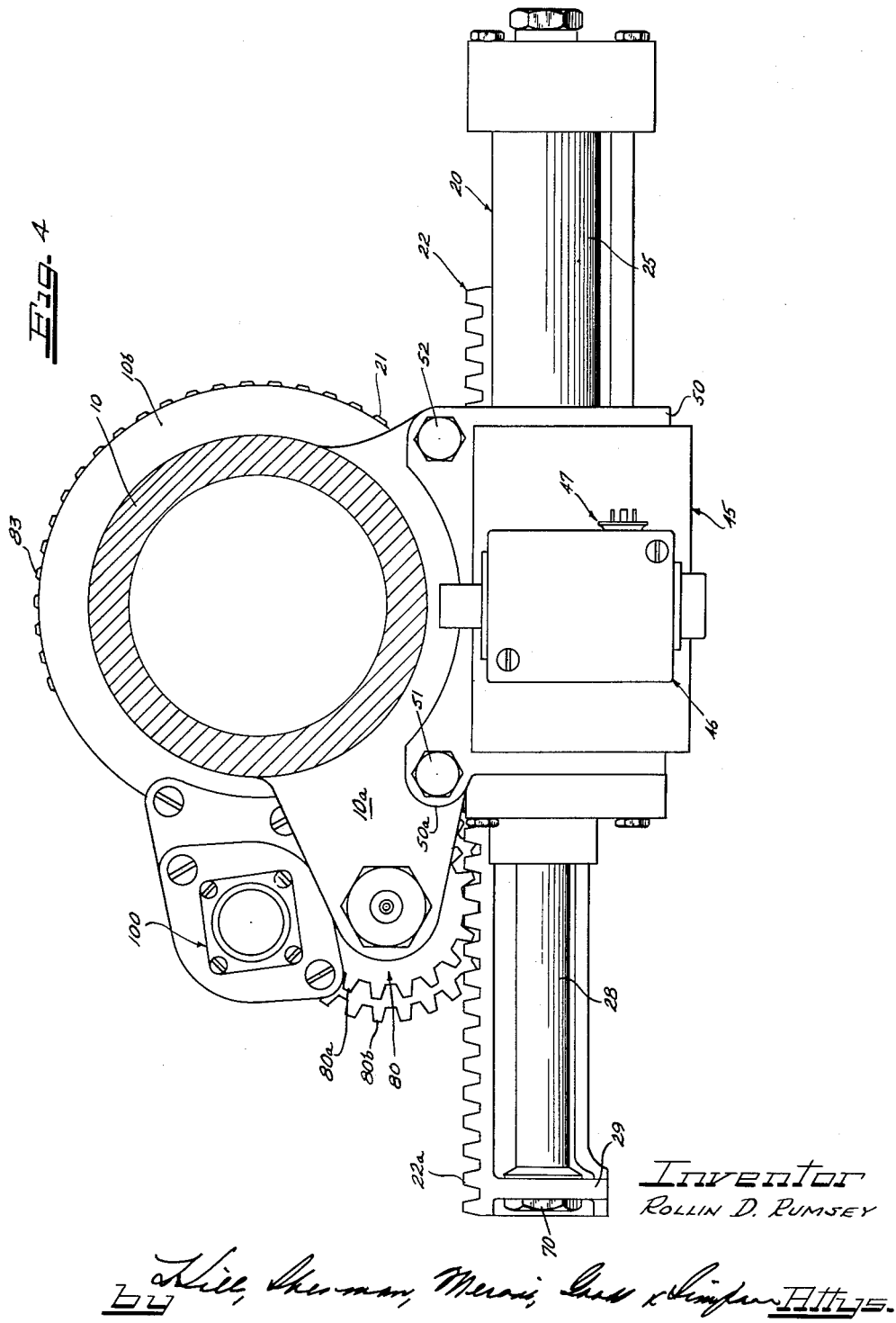

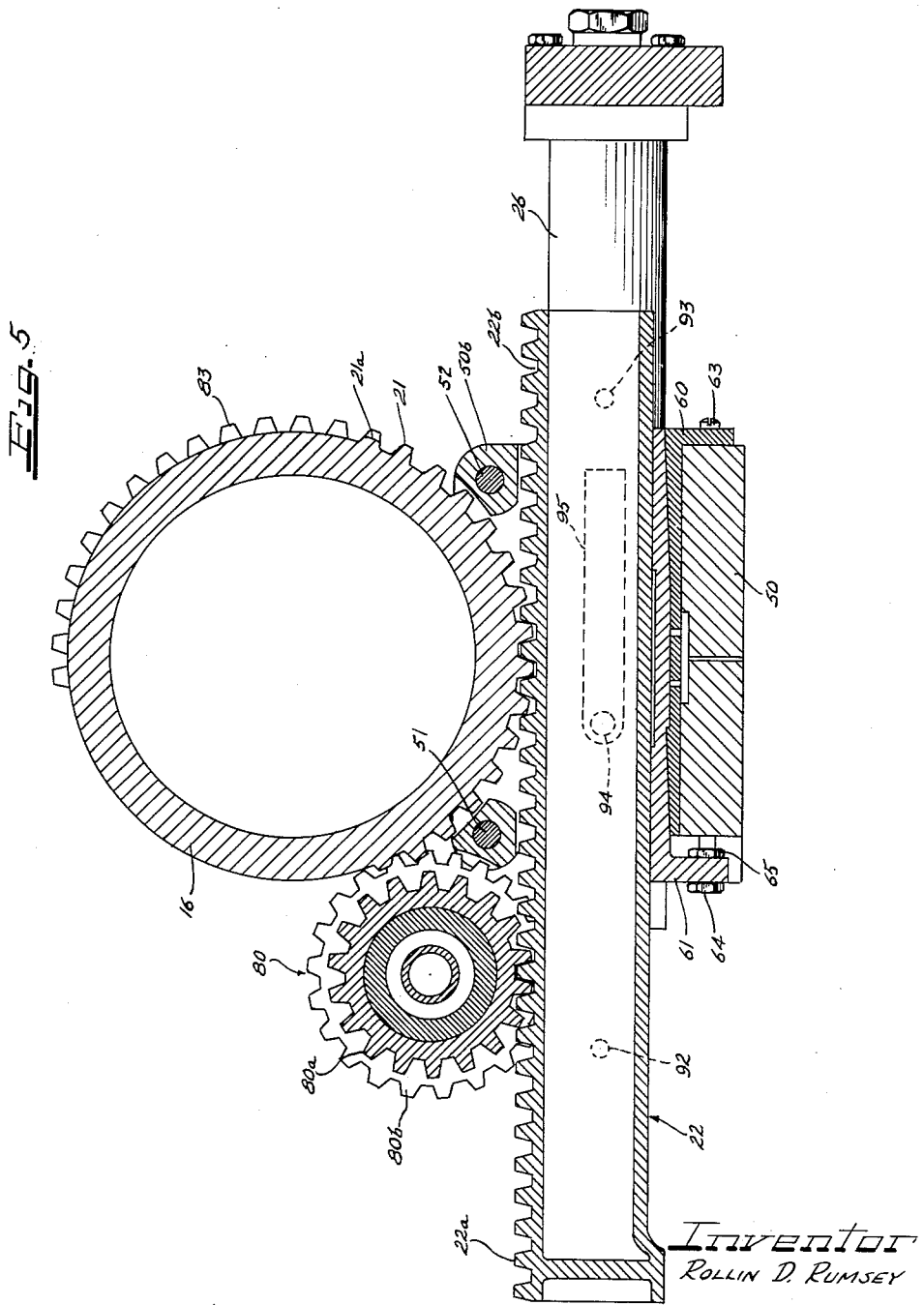

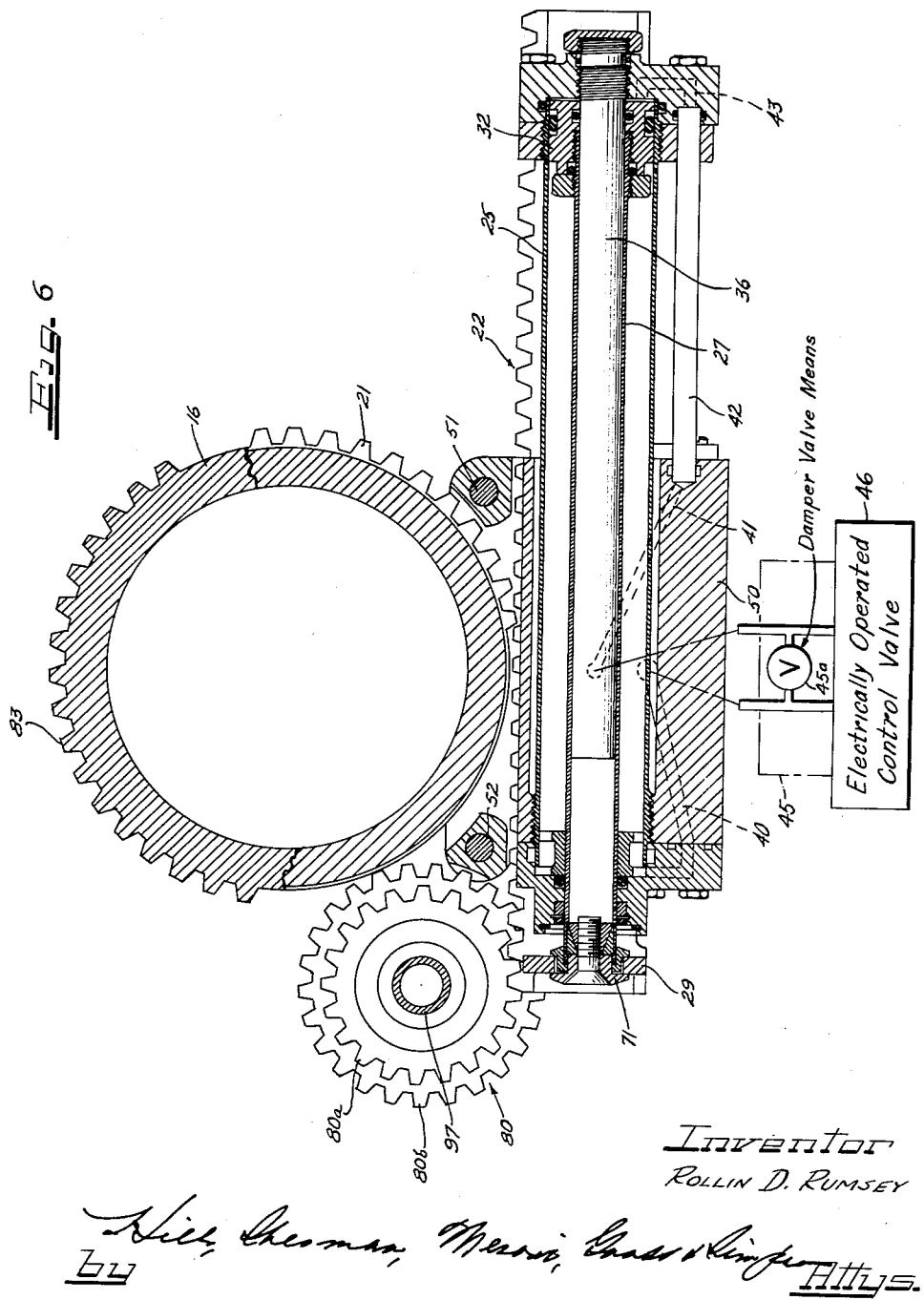

United States Patent Office 2,974,905
Patented Mar. 14, 1961

2,974,905

LINEAR TYPE SHIMMY AND STEER DAMPER

Rollin D. Rumsey, Buffalo, N.Y., assignor to Houdaille Industries, Inc., Buffalo, N.Y., a corporation of Michigan Filed Dec. 10, 1956, Ser. No. 627,199

11 Claims. (Cl. 244—50)

This invention relates to a rotary shaft control means and particularly to a steering and shimmy dampening mechanism adapted for the steering wheels of aircraft and the like.

It is an important object of the present invention to provide a rotary shaft control means providing extreme rigidity between the shaft and the actuator for the control.

It is a further object of the present invention to provide a novel and improved rotary shaft control means designed to provide 360° rotation of the shaft.

It is another object of the present invention to provide a wheel steering and damping mechanism utilizing a rack to transmit the steering and damping forces, and a gear rigidly connected with the wheel.

It is a still further object of the present invention to provide novel means for eliminating backlash in a steering and damping assembly.

Another object of the invention is to provide a novel fluid system for controlling actuation of a cylinder and piston assembly or the like.

Other objects, features and advantages of the present invention will be more fully apparent from the following detailed description taken in connection with the accompanying drawings, in which:

Figure 1 is a fragmentary side elevational view of a steering wheel supporting structure and its connection with an airplane, and showing the control mechanism of the present invention applied thereto;

Figure 2 is a fragmentary enlarged side elevational view of the control mechanism of the present invention with certain parts broken away and in section;

Figure 3 is a fragmentary elevational view taken generally at right angles to the showing of Figure 2;

Figure 4 is a horizontal sectional view and illustrating the control mechanism of the present invention in top plan;

Figure 5 is a horizontal sectional view illustrating the mechanism in neutral position;

Figure 6 is a horizontal sectional view illustrating the mechanism at one extreme of its control range;

Figure 7 is a fragmentary enlarged horizontal sectional view taken along the line VII—VII of Figure 2 and showing the manner of eliminating backlash between the rack and gear section.

As shown on the drawings:

Referring to Figure 1, A indicates the body structure of an airplane from which extends an oleo strut O comprising a member 10 hinged to the airplane body as indicated at 11 and an element 12 which terminates in a fork 13 journaling the wheel W to be controlled. The oleo strut is well known in the art, the member 10 containing spring means or hydraulic fluid flow resistance means for dampening movement of the element 12 to absorb the shock of vertical movement of the wheel W. Links 14 and 15 are hinged together at their outer ends and have their ends connected, respectively, to the fork 13 and to a ring 16 journaled on the member 10.

For controlling rotary movement of the element 12 and ring 16, a piston assembly 20 seen in Figure 3 is coupled to the ring 16 by means of a gear segment 21, Figure 4, on the ring 16 which meshes with a linearly reciprocating rack member 22. Specifically as illustrated in Figure 3, there are two cylinder members 25 and 26 having respective pistons 27 and 28 connected to a cross head 29 carried by the rack 22. Each of the piston rods such as 27 carries a piston member such as 32 in Figure 6 slidable in the cylinder and dividing the interior of the cylinder into two working chambers. As seen in Figure 6 a suitable guide rod 36 may be provided within the piston rod 27 so as to maintain the working chambers of substantially equal cross section, the guide rod 36 extending within the right hand working chamber as seen in Figure 6 as piston member 32 is moved to the left. Suitable connecting passages such as indicated at 40, 41, 42 and 43 may be provided for connecting the respective working chambers with a valve mechanism which may be located as indicated by the reference numeral 45. The valve mechanism 45 may have suitable inlet and outlet connections as indicated at 48 and 49 in Figure 3 for attachment to hoses leading from a source of fluid under pressure carried within the body of the aircraft. Suitable electrically operated control valve means may be located as indicated by the referenec numeral 46 in Figures 1 and 4 for controlling the supply of fluid under pressure from the inlet 48 of the valve mechanism 45 to the cylinders 25 and 26 to steer the wheel. In the illustrated embodiment, electric control power may be supplied to the mechanism 46 by means of a suitable plug connector such as indicated at 47 in Figure 4.

It will be readily understood that during the damping mode, circulation between the working chambers on the respective sides of the piston members 32 is retarded by damper valve 45a, Figure 6, of the valve mechanism 45 in such a manner as to afford a predetermined resistance to turning of the collar 16 in either direction from a central or neutral position. In the steering mode, fluid under pressure is supplied to one working chamber of each cylinder from inlet 48 so as to turn the sleeve 16 and wheel W in the desired direction through extension or retraction of the pistons 27 and 28.

As illustrated in Figures 2 and 4, the strut 10 has flange means 10a to which the ratchet supporting bracket 50 is attached by means of bolts 51 and 52. As seen in Figure 2, the bolts such as 51 extend through flange means 50a on the bracket 50 and through flange means 10b on the strut 10 and through fittings 50b on the bracket 50 and have nuts 55 at the lower end thereof.

For eliminating backlash, the bracket 50 has a pair of wedge members 60 and 61, Figures 5 and 7, adapted to operate to force the rack member 22 into tight engagement with the teeth 21 on the ring 16. The wedge member 60 is fixed to the bracket 50 by means of a screw 63, and the wedge member 61 is adjustable by means of a screw 64 having a nut 65 cooperating to position the wedge member 61. The rack 22 is adapted to move in a channel 67, Figure 2, provided by the bracket 50 with the wedge member 61 adapted to urge the rack 22 laterally of the channel 67 toward the center line of the strut 10. Adjustment to eliminate backlash is made by loosening the bolts 70 and 71, Figures 3 and 6, on the ends of the cylinder rods 27 and 28 and adjusting the rack to zero backlash in the center position and then retightening the piston rod bolts 70 and 71 with the rods 27 and 28 fully entered into the respective cylinders 25 and 26. This will assure near perfect alignment throughout the stroke with minimum bearing loads and zero backlash. The illustrated gear-rack configuration reduces the possible source of backlash to just one joint which can be adequately controlled as described above. It was found that configurations employing links and pivots were unsuitable for certain applications because of the need for extreme rigidity.

For allowing 360° swiveling of the wheel W, the rack 22 is provided with a return mechanism including a gear 80 carried by the flange means 10a and including upper teeth 80a in mesh with the rack teeth 22a and lower gear teeth 80b for meshing with the teeth 83 on the ring 16 during the time when the wheel is out of its controlled range.

Figure 5 illustrates the ring 16 in its central position. Angular movements for 73° in either direction from the central position of the ring 16 and wheel W is damped through the rack 22 and pistons 27 and 28. In steering mode, cylinders 25 and 26 are operative to rotate the ring 16 for 73° in either direction from the central position shown in Figure 5. During this operative control range of 146°, the gear 80a is in mesh with the rack 22 but the gear 80b is not in mesh with the teeth 83 on collar 16.

Figure 6 illustrates the wheel at one extreme of its controlled range with the rack 22 at its extreme right hand position. Upon continued turning of the ring 16 beyond its controlled range, the rack return teeth 83 come into mesh with the gear 80b to turn the gears 80b and 80a in the clockwise direction and to shift the rack 22 to the left. Thus, if the ring 16 continues to swivel in the counterclockwise direction as seen in Figure 6, the leading tooth 21a will come into mesh with the rack 22 at the valley 22b shown in Figure 5, after which continued rotation of the ring 16 in the counterclockwise direction will begin to move the rack 22 to the right toward the central position shown in Figure 5. For maintaining the rack in its extreme positions, the rack is provided with a pair of detent sockets 92 and 93, Figure 5, cooperating with a spring urged detent 94 carried on a leaf spring 95 as seen in Figures 2 and 5. The detent 94 is shown in engagement with the socket 92 in Figure 2 for illustrative purposes even though the ring 16 is not shown in the corresponding angular position, but is shown in the angular position of Figure 5.

As illustrated in Figure 2, the gears 80 may be mounted by means of a vertical shaft 97 extending through the flange means 10a and the flange 10b of the strut 10.

Summary of operation

In operation of the mechanism, during the damping mode, rotary movement of the ring 16 is damped for 73° in the clockwise or counterclockwise direction from the central position illustrated in Figure 5. Rotation of the ring 16 with the wheel W in the counterclockwise direction from the position shown in Figure 5 moves the rack 22 to the right to the position shown in Figure 6 where it is maintained by means of the detent 94 and detent socket 92 shown in Figure 5. Continued counterclockwise rotation of the ring 16 brings the gear teeth 83 into engagement with the idler gear 80b to rotate the idler gear 80a clockwise and return the rack 22 to the left from the position shown in Figure 6. As seen in Figure 6, there may be a slight time interval between the time when the teeth 21 on ring 16 move out of engagement with the teeth of the rack 22 and the time when the teeth 83 of the ring 16 move into engagement with the idler gear 80b. The detent means such as 94 serves to maintain the rack 22 in proper position during this interval when rack 22 is disengaged from ring 16. Upon full rotation of the ring 16, in the counterclockwise direction, the rack 22 is returned until the detent 94 engages the socket 93 of Figure 5 whereupon the leading tooth 21a of the gear teeth 21 on the ring 16 will engage in the valley 22b shown in Figure 5 to again move the rack 22 to the right. Movements of the rack 22 are damped by means of the pistons 27 and 28 in cooperation with the cylinders 25 and 26.

In the steering mode, pressure is applied to one side of the piston members 32 shown in Figure 6 to shift the rack 22 in the desired direction. Linear movement of the rack 22 is translated into rotary movement of the ring 16 through the gear teeth 21 as seen in Figure 5 within the steering range of the mechanism.

Because of the single non-rigid connection between the wheel W and the pistons 27 and 28, backlash can be held to a minimum. Backlash is taken up by means of the adjusting screw 64 shown in Figure 7 to provide a highly rigid connection between the wheel W and the pistons 27 and 28 with a consequent highly efficient damping action of the mechanism.

It will be apparent that many modifications and variations may be effected without departing from the scope of the novel concepts of the present invention.

I claim as my invention:

1. In combination for controlling rotary movement of a member, rotary motion transmission means rigidly coupled to said member for movement therewith, rectilinear motion transmission means disposed for direct engagement with said rotary transmission means over a predetermined range of rotary movement of said rotary transmission means, detent means for defining limit positions of said rectilinear motion transmission means at the end of its range of engagement with said rotary motion transmission means, and means for shifting said rectilinear motion transmitting means independently of the rotary motion transmission means outside of said range.

2. An assembly comprising damping means having an actuator, rack and gear means respectively connected to said actuator and to a part whose motion is to be damped, said rack and gear means being disengaged outside of a predetermined range of movement of said part, and means for controlling reengagement of said rack and gear means upon movement of the part back into operative range of said damping means.

3. In combination with a strut, collar means rotatably mounted on the strut and coupled to a wheel carried by the strut, a bracket carried by the strut adjacent said collar means, gear means rigid with said collar means and extending over a predetermined portion of the periphery of said collar means, rack means disposed generally tangent to said collar means and slidably carried by said bracket means and having teeth for engagement with said gear means during a predetermined range of angular movement of said collar means on said strut, means for controlling reciprocating movement of said rack means relative to said bracket within the range of engagement thereof with said gear means, and means for controlling movement of said rack means outside of the range of engagement thereof with said gear means to reposition said rack means with respect to said gear means as said collar means returns to the operative range of said reciprocating movement controlling means.

4. In combination with a strut, collar means rotatably mounted on the strut and coupled to a wheel carried by the strut, a bracket carried by the strut adjacent said collar means, gear means rigid with said collar means and extending over a predetermined portion of the periphery of said collar means, rack means disposed generally tangent to said collar means and slidably carried by said bracket means and having teeth for engagement with said gear means during a predetermined range of angular movement of said collar means on said strut, means for damping reciprocating movement of said rack means relative to said bracket means, means for controlling movement of said rack means outside of the range of engagement thereof with said gear means to reposition said rack means with respect to said gear means as said collar means returns to the operative range of said damping means, and detent means for defining the limits of reciprocating movement of said rack means.

5. In combination, a strut, a wheel swivelly mounted by said strut, a torque transmitting member arcuately mounted by said strut and coupled to said wheel, gear-means rigidly carried by said torque transmitting member, rack means for direct driving connection with said gear means carried by said strut, fluid actuated control means controlling movement of said rack means, said rack and gear means being engageable over a predetermined range of angular positions of said torque transmitting member, additional gear means carried by said torque transmitting member, and idler gear means interposed between said additional gear means and said rack means for controlling the position of said rack means when said rack means is out of engagement with said first mentioned gear means to maintain a predetermined relation between said rack means and said first mentioned gear means during arcuate movement of said torque transmitting member outside of its control range of angular positions.

6. In combination, a strut, a wheel swivelly mounted by said strut, a torque transmitting member arcuately mounted by said strut and coupled to said wheel, gear means rigidly carried by said torque transmitting member, rack means for driving connection with said gear means carried by said strut, fluid actuated control means controlling movement of said rack means, said rack and gear means being engageable over a predetermined range of angular positions of said torque transmitting member, additional gear means carried by said torque transmitting member, idler gear means interposed between said additional gear means and said rack means for controlling the position of said rack means when said rack means is out of engagement with said first mentioned gear means to maintain a predetermined relation between said rack means and said first mentioned gear means during arcuate movement of said torque transmitting member outside of its controlled range of angular positions, and wedge adjustment means shiftable longitudinally of said rack means to press said rack means into engagement with said gear means to take up backlash.

7. In combination, a strut, a wheel swivelly mounted by said strut, a torque transmitting member arcuately mounted by said strut and coupled to said wheel, gear means rigidly carried by said torque transmitting member, rack means for driving connection with said gear means carried by said strut, fluid actuated control means controlling movement of said rack means, said rack and gear means being engageable over a predetermined range of angular positions of said torque transmitting member, additional gear means carried by said torque transmitting member, idler gear means interposed between said additional gear means and said rack means for controlling the position of said rack means when said rack is out of engagement with said first mentioned gear means to maintain a predetermined relation between said rack means and said first mentioned gear means during arcuate movement of said torque transmitting member outside of its controlled range of angular positions, and detent means cooperating with detent sockets in said rack means to define limit positions of said rack means at the extremes of linear movement thereof.

8. In combination, a collar for coupling to a wheel and for rotation on a common axis with the wheel, gear teeth rigidly fixed on said collar and extending about a portion of the periphery of said collar, a rack having linearly disposed teeth rigid therewith for meshing directly with said gear teeth on said collar to move the rack in a direction corresponding to that of an adjacent portion of said collar in a range of angular positions of said collar, cylinder and piston means having a linearly movable part connected rigidly with said rack and having opposite working chambers, means connected with said working chambers for restricting the interchange of fluid between said chambers to damp movement of said collar, and means coupled to said collar and to said rack for moving the rack in a direction opposite to that of an adjacent portion of said collar when said collar moves outside said range of angular positions thereof to provide for re-engagement of said rack with said gear teeth on said collar in a predetermined relative relation each time said collar moves back into said range of angular positions in either direction.

9. In combination, bracket means for assembly on a strut of an aircraft wheel assembly, a rack for mounting by said bracket means for linear reciprocation and having a linear series of control rack gear teeth and a series of repositioning rack gear teeth, a collar for mounting on the strut and for coupling to a wheel associated with the strut, said collar having a first series of control gear teeth extending about a portion of the periphery thereof for meshing with said series of control rack gear teeth in a control range of angular positions of said collar, said collar having a second series of repositioning gear teeth extending about a portion of the periphery of said collar offset from said first series of control gear teeth, said first series of control gear teeth on said collar moving completely out of engagement with said control rack gear teeth beyond said control range of angular positions of said collar to accommodate movement of said rack in a direction opposite to the direction of movement of said first series of control gear teeth on said collar, gear means meshing with said second series of repositioning gear teeth and with said repositioning rack gear teeth to position the rack for reengagement of corresponding teeth of said control rack gear teeth and said first series of control gear teeth each time the collar returns to its control range of angular positions, and control means coupled to said rack for controlling the movement of said collar by means of the engagement of said control rack gear teeth and said first series of control gear teeth on said collar.

10. In combination, a strut member, a wheel carrying element swivelly mounted by said strut member, a torque transmitting collar rotatably mounted on said strut member, means for coupling said collar with said wheel carrying element for conjoint movement over 360° of angular rotation of said wheel carrying element and said collar, said collar having a first series of control gear teeth extending about a portion of the periphery thereof and rigidly connected directly therewith and having a second series of repositioning gear teeth directly connected therewith and extending about a portion of the periphery of the collar offset from said first series of control gear teeth, a rack carried by said strut member and having a linear series of control rack gear teeth meshing with said first series of control gear teeth in a control range of angular positions of said collar and having a series of rack repositioning gear teeth, control means coupled to said rack for controlling linear reciprocating movement of said collar through said control rack gear teeth and said first series of control gear teeth of said collar, a first repositioning idler gear mounted by said strut member and meshing with said rack repositioning gear teeth laterally adjacent the point where said rack control gear teeth mesh with said first series of control gear teeth, a second repositioning idler gear mounted by said strut member and disposed for meshing engagement with said second series of repositioning teeth on said collar when the collar is outside its control range of angular positions, means coupling said first and second repositioning idler gears for conjoint rotation when said second repositioning gear is driven by said second series of repositioning gear teeth to move said rack in a direction opposite to that of said collar and to place said rack in position for reengagement of corresponding teeth of said first series of control gear teeth and said rack control gear teeth each time the collar returns to its control range of angular position in either direction of rotation thereof.

11. In combination, a strut member, a wheel carrying element swivelly mounted by said strut member, a torque transmitting collar rotatably mounted on said strut member, means for coupling said collar with said wheel carrying element for conjoint arcuate movement through 360° of rotation of said collar and said wheel carrying element, said collar having a series of control gear teeth extending about a portion of the periphery thereof, a rack carried by said strut member and having a linear series of control rack gear teeth meshing with said series of control gear teeth on said collar in a control range of angular positions of said collar, control means coupled to said rack for controlling linear reciprocating movement thereof and for controlling arcuate movement of said collar through said control rack gear teeth and said series of control gear teeth in said control range of angular positions of said collar, said series of control gear teeth on said collar moving completely out of engagement with said control gear teeth on said rack when said collar is beyond its control range of angular positions, and repositioning means coupled to said rack and operative to move the rack in a direction opposite to the direction of rotation of the collar outside of its control range of angular positions to position the rack for reengagement of corresponding teeth of said control rack gear teeth and said series of control gear teeth on said collar each time said collar returns to its control range of angular positions in either direction of rotation of said collar.

References Cited in the file of this patent

UNITED STATES PATENTS

| | | |
|---|---|---|
| 2,410,643 | Fielding | Nov. 5, 1946 |
| 2,492,649 | MacDuff | Dec. 27, 1949 |
| 2,651,385 | Clark et al. | Sept. 8, 1953 |
| 2,681,438 | Anderson | June 15, 1954 |
| 2,712,422 | Gerwig | July 5, 1955 |
| 2,756,949 | Smith | July 31, 1956 |
| 2,779,556 | Hogan | Jan. 29, 1957 |